Jan. 22, 1963 E. E. BREUNING 3,074,670
QUICK DISCONNECT COUPLING FOR HIGH PRESSURE FLUIDS
Filed Aug. 4, 1958 4 Sheets-Sheet 1

INVENTOR
Erich E. Breuning
By Smyth & Roston
Attorneys

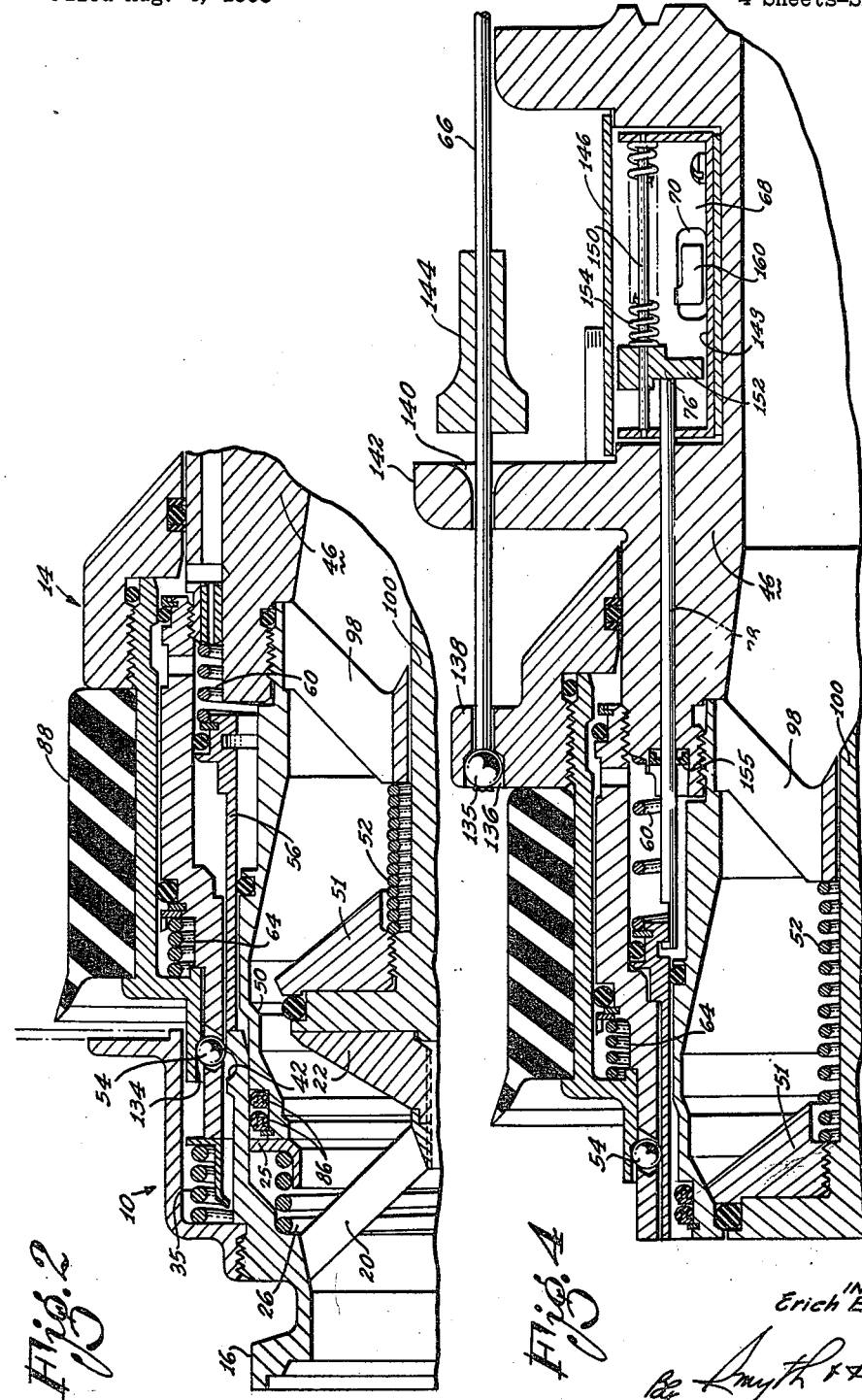

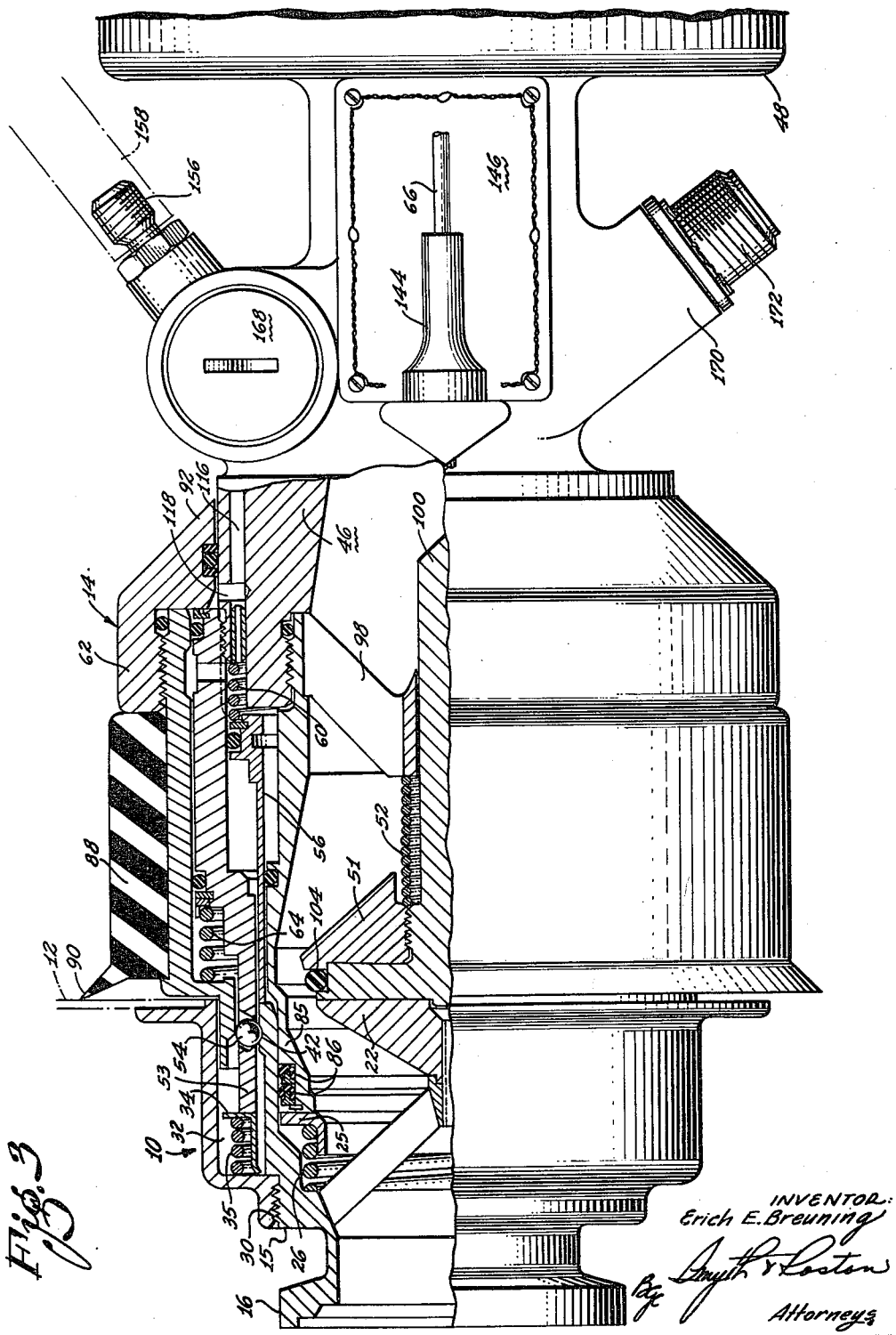

Jan. 22, 1963 E. E. BREUNING 3,074,670
QUICK DISCONNECT COUPLING FOR HIGH PRESSURE FLUIDS
Filed Aug. 4, 1958 4 Sheets-Sheet 4
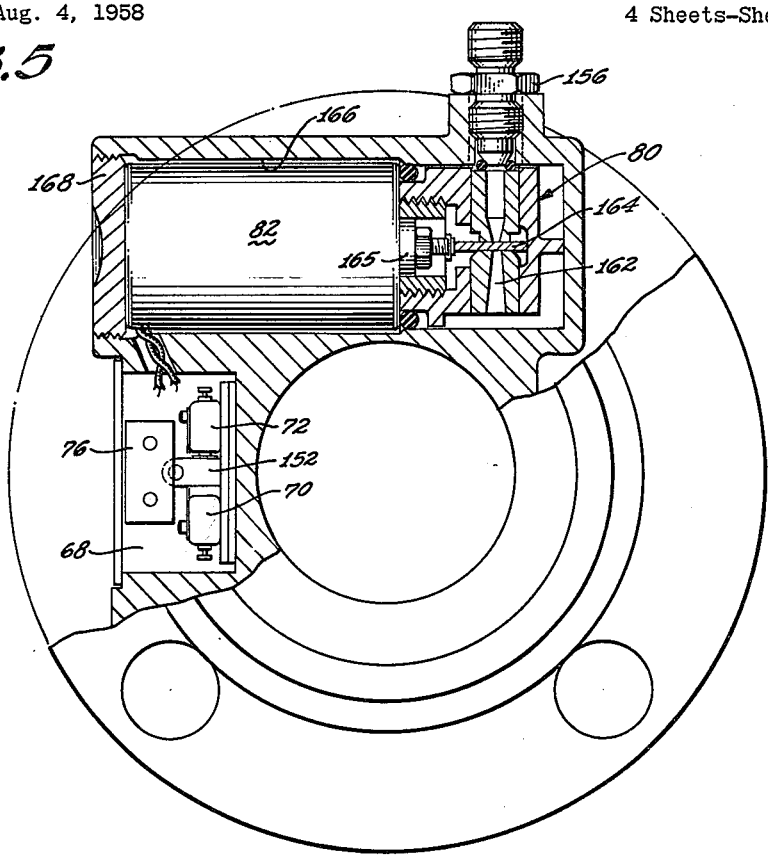
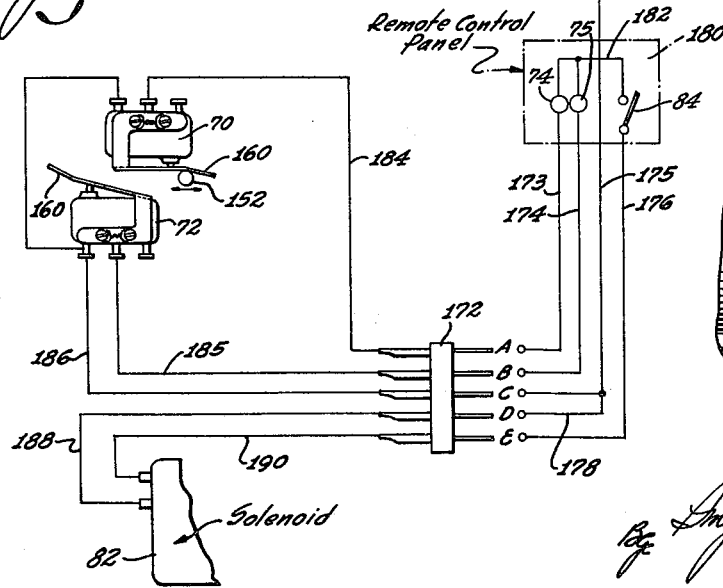
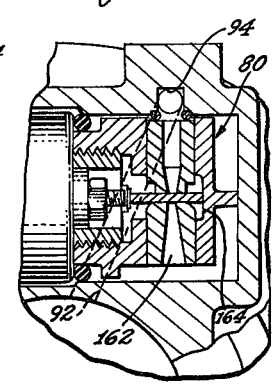

3,074,670
QUICK DISCONNECT COUPLING FOR HIGH
PRESSURE FLUIDS
Erich E. Breuning, Hollywood, Calif., assignor, by mesne
assignments, to On Mark Couplings, Inc., Los Angeles,
Calif., a corporation of California
Filed Aug. 4, 1958, Ser. No. 752,771
11 Claims. (Cl. 244—130)

This invention relates to a quick disconnect coupling for releasably interconnecting two fluid passages for high-pressure service.

While the invention may be widely applied in various ways for various specific purposes, it has special utility for connecting a liquid gas supply line to a missile, or the like, and the invention has been initially constructed to meet certain problems encountered in such use. This particular practice of the invention is described herein for the purpose of disclosure and will guide those skilled in the art who may have occasion to apply the same principles to other specific purposes.

A coupling of the present type comprises two coupling bodies that form end portions of the two fluid passages respectively, and the operation of connecting the two fluid passages together consists simply of manually forcing the two coupling bodies together axially, the leading end of one coupling body telescoping into the leading end of the other. For use in charging a missile with liquid gas, the male coupling body is incorporated in the missile and may be termed an adapter or adapter fitting. The female member, which may be termed a socket or socket fitting, is mounted on the end of a flexible supply hose.

A coupling of the present type further includes radially expansible and contractible engagement means on one of the coupling bodies for releasable engagement with a circumferential shoulder on the other coupling body together with a yieldingly retractable locking sleeve to hold the engagement means in its effective position for positively locking the two coupling bodies together. The adapter on the missile is provided with the required circumferential shoulder, the engagement means and the locking sleeve being on the socket.

It is desirable that such a coupling for use in supplying liquid gas to a missile operate in a simple, positive and foolproof manner and require only moderate manual force for both connecting and disconnecting the two fluid lines. It is contemplated that a maximum manual force of only thirty pounds will be required to interlock the two coupling bodies and with the connected fluid passages under fluid pressure of 50 p.s.i., a maximum manual force of only fifty pounds will be sufficient to break the connection.

The features that meet this problem of making the coupling operable with manual force of such low magnitude will be apparent from the later detailed description of the invention. One of these features is the provision of an annular member or sleeve movably mounted on the socket under spring pressure to function as an ejector by thrusting against the adapter fitting on the missile to tend to separate the socket fitting therefrom. Another of these features is the provision of a lanyard with fulcrum means for effective leverage in manually retracting the locking sleeve.

Another problem arises from the fact that such as coupling for use with a missile should be capable of disconnection reliably and substantially instantly by remote control in addition to being adapted for disconnection manually at the coupling. To meet this problem, the socket fitting incorporates fluid-pressure-actuated means for the application of power to carry out the disconnecting operation and this fluid-actuated means is connected under remote control to a source of suitable fluid such as nitrogen or helium under relatively high pressure for quick operation. The pressure, for example, may be on the order of 750 p.s.i. In this regard, a feature of the invention is the attainment of substantially instant disconnect operation by maintaining the high pressure in the control line right up to the socket fitting and by incorporating a solenoid valve in the socket fitting to release the high-pressure fluid for the disconnecting operation. The liquid gas line can also be used for disconnection by means of openings directly from the liquid gas line to the solenoid.

To carry out this concept, an annular chamber is provided in the socket fitting to receive the pressurized fluid for power retraction of the locking sleeve and a second annular chamber is provided for the power thrust of the ejector against the adapter fitting. In the preferred practice of the invention, these chambers are charged in sequence to delay the ejector thrust until the locking sleeve releases the engagement means, and a feature of the invention is the use of the locking sleeve itself as valve means to control fluid flow into the second chamber.

Still another problem is to provide for monitoring the connecting and disconnecting operations from the remote control station. For this purpose, remote signal means is provided to indicate whether or not the two coupling bodies are interlocked. In the preferred practice of the invention, two lamp switches are incorporated in the socket fitting under control of a moving part of the adapter fitting, one switch energizing one signal lamp when the socket is positively interlocked with the adapter, the other switch energizing a second lamp when the socket is thrust free from the adapter.

A further problem is to provide valve means to close the open ends of the two coupling bodies as soon as they are disconnected from each other. Automatic closing of the socket fitting prevents waste of the liquid gas. A related problem is to avoid "spitting" of liquid gas, i.e. release of trapped liquid gas into the atmosphere as the two coupling members are separated from each other. As will be explained, these problems are met by providing each coupling body with a spring-pressed valve that is retracted by the other coupling body and by further providing for the two valve-equipped coupling bodies to mate with each other with no intervening space to trap liquid gas, the two valve members being arranged to close simultaneously as the two coupling bodies separate from each other.

A still further problem is to restore the streamlined continuity of the missile surface as soon as the disconnection is made. For this purpose, the closed position of the adapter fitting valve is flush with the missile surface and an annular closure means is provided for the annular recess around the adapter fitting that receives the locking parts of the socket fitting. These locking parts are the engagement means and the associated locking sleeve. The annular closure is spring-pressed to yield inwardly whenever the socket fitting is interlocked with the adapter fitting.

Certain further problems are encountered. One of these further problems is to keep the spring-pressed locking sleeve from damaging the missile's skin. Another of these further problems is to keep moisture out of the coupling when the oxygen-charging operation is performed in the rain. A third problem is to keep the locking sleeve from being blocked against retraction by ice that tends to be formed on the socket fitting by the refrigeration effect of the extremely low temperature liquid gas.

These further problems are met by the construction of the locking sleeve. A ring of rubber-like material on the locking sleeve serves as a bumper to avoid damage to the skin and also serves as a rain seal in cooperation with the missile skin. The rear end of the locking sleeve is tapered to serve as an annular ice chisel and the high-pressure fluid that retracts the locking sleeve provides ample power for this chisel to break away any ice that may form.

The various features and advantages of the invention may be understood from the following detailed description considered with the accompanying drawings.

In the drawings, which are to be regarded as merely illustrative:

FIG. 2 is a fragmentary sectional view, showing the positions of the parts of the adapter and socket at an intermediate point in their relative movement into interlocking engagement;

FIG. 3 is a view similar to FIG. 1, showing the adapter and socket locked together for the transmission of fluid therethrough;

FIG. 4 is a fragmentary longitudinal section of the socket, the section being rotated 90 degrees away from the section of FIG. 1;

FIG. 5 is a rear elevation of the socket with portions broken away to show the structure of the remotely controlled solenoid-actuated valve that is incorporated in the construction of the socket;

FIG. 6 is a wiring diagram of the remote control system; and

FIG. 7 is a fragmentary sectional view, showing how the solenoid valve may be placed in communication with the fluid inside the coupling instead of being connected to an outside source of pressurized fluid.

*General Arrangement*

Figure 1:
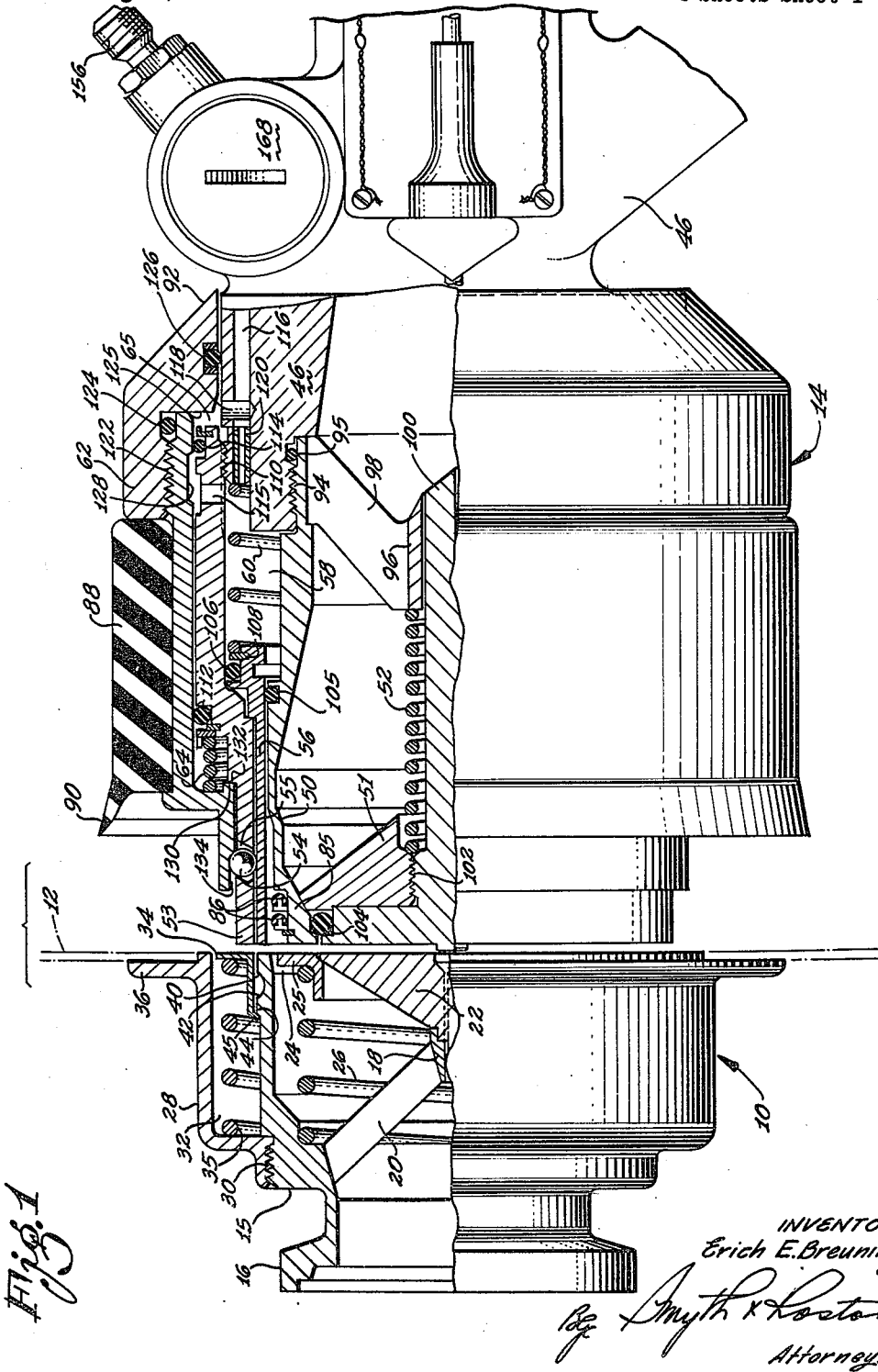
FIG. 1 is a view partly in side elevation and partly in longitudinal section, showing the adapter and the cooperating socket positioned close together for movement of the socket fitting into interlocking engagement with the adapter fitting.

FIG. 1 shows an adapter fitting, generally designated by numeral 10, which is mounted on a missile flush with the missile skin 12. FIG. 1 also shows a socket fitting, generally designated by numeral 14, poised close to the adapter in position for axial movement into interlocking engagement with the adapter.

The principal parts of the adapter fitting 10 are: an adapter body 15 of generally cylindrical configuration having a flanged inner end 16 for attachment to the fluid passage of the missile; a spider comprising a central body 18 and legs 20 united with the adapter body; a nose or forward wall member 22 mounted on the spider body 18 in a position substantially flush with the missile skin 12, which nose, together with the surrounding adapter body, forms an annular port 24; a ring-shaped valve member 25 which normally closes the annular port 24; a coil spring 26 to urge the ring-shaped valve member towards its closed position; an outer circumferential wall member 28 which is mounted on the adapter body 15 by screw threads 30 and may be regarded as a unitary part of the adapter body; an annular recess or well 32 defined by the adapter body 15 and the outer circumferential wall member 28; a flanged closure ring 34 which normally closes the annular recess 32 in a position substantially flush with the missile skin 12; and a coil spring 35 in the recess 32 urging the closure ring 34 towards its normal forward position.

The outer circumferential wall member 28 has a flange 36 by means of which it may be attached to the inner side of the missile skin 12 to place the adapter flush with the skin. The adapter body 15 has an outer circumferential locking shoulder 40 for locking engagement by the socket 14, and this shoulder may be formed by a circumferential groove 42 of rounded cross-sectional configuration. The adapter body 15 is further formed with a tapered shoulder 44 which cooperates with a tapered flange 45 of the closure ring 34 to serve as a stop for the closure ring at its normal forward position.

The principal parts of the socket 14 include: a socket body 46 made of a number of sections joined together and having a rear end flange 48 (FIG. 3) for attachment to the end of a flexible hose; an inner circumferential wall 50 formed by the socket body 46 to telescope into the adapter body 15; a poppet valve 51 normally closing the forward end of the socket body 46; a spring 52 urging the poppet valve towards its normal forward closed position; an outer circumferential wall 53 of the socket body to extend into the annular recess 32 and telescope over the adapter body 15; radially expansible and contractible means in the form of a plurality of balls 54 mounted in apertures 55 in the outer circumferential wall 52 for locking engagement with the circumferential shoulder 40 of the adapter body 15; an ejector sleeve 56 retractably mounted between the circumferential walls 50 and 53 to thrust against the rim of the adapter body 15; an annular power chamber 58 defined by the two circumferential walls 50 and 53 rearwardly of the ejector sleeve 56 for fluid-pressure actuation of the ejector sleeve; a coil spring 60 in the annular chamber 58 urging the ejector sleeve towards its normal forward position at which the ejector sleeve retains the balls 54 against radially inward movement; a locking sleeve 62 surrounding the outer circumferential wall 53 and movable axially thereof between a normal retracted position and a forward position at which the locking sleeve locks the balls 54 in engagement with the circumferential locking shoulder 40 of the socket body 15; a coil spring 64 urging the locking sleeve 62 towards its forward locking position; an annular power chamber 65 for fluid-pressure-actuated retraction of the locking sleeve; a U-shaped lanyard 66 (FIGS. 3 and 4) to permit convenient manual retraction of the locking sleeve; a rearward switch chamber 68 housing a pair of lamp switches 70 and 72, both of which are biased to open in the absence of actuating force (FIGS. 4, 5 and 6); a pair of remote signal lamps 74 and 75 (FIG. 6) controlled by the two switches, respectively; a switch actuator 76 movably mounted in the switch chamber 68 and connected by a push-pull rod 78 to the ejector sleeve 56 for actuation thereby; a normally closed valve 80 (FIG. 5) carried by the socket body 46 to control the flow of pressurized actuating fluid into the two annular chambers 58 and 65; a solenoid 82 for energization to open the valve 80; and a remote control switch 84 (FIG. 6) for controlling the solenoid 82.

The inner circumferential wall 50 of the socket body 46 is increased in thickness to provide a radially inwardly extending rim portion 85 that has a number of functions. One function is to cooperate with the poppet valve 51 to close the open end of the socket in a fluid-tight manner when the socket is disconnected from the adapter 10. Another function is to abut and retract the ring-shaped valve member 25 of the socket when the two coupling bodies are connected together. A third function is to carry suitable sealing contact with the inner circumferential surface of the adapter body 15 when the two coupling bodies are interconnected.

The locking sleeve 62 is preferably embraced by an annular member 88 of rubber-like material with a forwardly extending lip 90, which member serves as a bumper to avoid damage to the missile skin 12 and also serves as a rain seal when the two coupling bodies are interconnected. Preferably, the locking sleeve 62 is formed with a rearward chisel edge 92 to break away any ice that may form in its path of retraction.

*General Mode of Operation*

FIG. 1 shows the normal positions of the parts of the adapter fitting 10 and the socket fitting 14 when the two fittings or coupling bodies are disconnected from each other. The ring-shaped valve member 25 of the socket is at its forward position substantially flush with the missile skin 12, and the closure ring 34 is at a similar forward position. Since it is desirable to provide a vent for the release of gaseous oxygen after a fueling operation, the ring-shaped valve member 25 does not close the adapter in a fluid-tight manner. In the present construction, the leading edge of the adapter body 15 is slightly chamfered or tapered, as may be seen in FIG. 1, to provide a slight vent clearance around the ring-shaped valve member 25. This taper is also helpful to facilitate the movement of the sealing rings 86 into the adapter body.

The ejector sleeve 56 in FIG. 1 is in its normal extended position holding the locking balls 54 in their normal radially outward positions at which the locking balls block the forward movement of the locking sleeve 62 and hold the locking sleeve retracted in opposition to the coil spring 64. The poppet valve 51 is in its normal forward closed position. The valve 80 is closed, the solenoid 82 being de-energized, and the two annular chambers 58 and 65 are under atmospheric pressure. Since the ejector sleeve 56 is at its forward position, the switch actuator 76 is also in its forward position and holds the lamp switch 70 closed whereby the signal lamp 74 is energized to indicate that the two coupling bodies are disconnected from each other.

In FIG. 2, the socket fitting 14 is partially inserted into the adapter fitting 10. The inner circumferential wall 50 has telescoped into the adapter body 15 and in doing so has partially retracted the ring-shaped valve member 25. The sealing rings 86 that are carried by the inner circumferential wall member 50 have made sealing contact with the inner circumferential surface of the adapter body 15. The poppet valve 51 has been substantially retracted by abutment against the nose or forward wall member 22 of the adapter 10. The ejector sleeve 56 is retracted rearwardly from the locking balls 54 by abutment against the rim of the adapter body 15, but the locking balls are held at their radially outward positions by the adapter body 15. Since the locking balls 54 are at their radially outward positions, the balls still hold the locking sleeve 62 in its retracted position in opposition to the force of the spring 64.

Since the ejector sleeve 56 is partially retracted, the switch actuator 76 is also partially retracted to permit the lamp switch 70 to open for de-energization of the indicator lamp 74, but since the ejector sleeve is not fully retracted, the switch actuator 76 does not close the second lamp switch 72. Thus, both of the lamps 74 and 75 are de-energized to indicate that the socket 14 is at an intermediate position with respect to the adapter 10. The valve 80 is, of course, still closed, the remote switch 84 being open and the solenoid 82 being de-energized.

FIG. 3 shows the positions of the parts of the coupling when the two coupling bodies are moved into final interlocking engagement with each other. The ring-shaped valve member 25 is completely retracted, and the joint between the two coupling bodies is sealed in a fluid-tight manner by the sealing rings 86. The final advance of the outer circumferential wall 53 of the socket 14 into the annular recess 32 has positioned the locking balls 54 at the circumferential groove 42 of the adapter body 15 to permit the balls to drop into the groove whereupon the locking sleeve 62 is snapped forward by the spring 64 to cam the balls 54 inward and to lock the balls in their inward positions. At this final forward position of the locking sleeve 62, the lip 90 of the rubber-like member 88 makes contact with the skin 12 to serve as a seal against rain or other moisture.

The ejector sleeve 56 is now completely retracted and consequently the switch actuator 76 is at its rearward limit position at which it closes the lamp switch 72 to energize the indicator lamp 75. The poppet valve 51 is now retracted to its fully open position by abutment against the nose or forward wall member of the adapter 10.

To disengage and separate the two coupling bodies manually, the locking sleeve 62 is retracted either by grasping the locking sleeve itself or by pulling on the lanyard loop 66. The retraction of the locking sleeve 62 releases the locking balls 54 to free the balls for return to their normally outwardly radial positions.

While the two coupling bodies are interlocked, the ejector sleeve 56 is fully retracted and the corresponding coil spring 60 continuously causes the ejector sleeve to thrust against the rim of the adapter body 15, thus tending to separate the two coupling bodies. The manual retraction of the locking sleeve 62 against the opposition of the spring 64 provides an additional force to tend to move the socket out of engagement with the adapter. With the locking sleeve 62 fully retracted against the socket body, the operator may apply even more force to pull the socket away from the adapter.

As a result of these forces, the circumferential locking shoulder 40 cams the locking balls 54 radially outward to their normal positions to free the socket completely for withdrawal from the adapter. The withdrawal of the socket is assisted by the thrust of the ejector sleeve 56 against the adapter body 15. As the outer circumferential wall 53 of the socket withdraws from the annular recess 32 of the adapter, the locking balls 54 are shifted from the surface of the adapter body 15 onto the surface of the ejector sleeve 56.

The complete withdrawal of the socket body from the adapter body permits the ring-shaped valve member 25 and the closure ring 34 to return to their normal forward position flush with the missile skin 12. At the same time, the poppet valve 51 is permitted to return to its normal forward position. Complete restoration of the ejector sleeve 56 to its normal forward position returns the switch actuator 76 to its normal forward position to close the lamp switch 70 and thereby energize the indicator lamp 74.

As may be understood from an inspection of FIG. 1, at the moment of complete separation of the two coupling bodies with the poppet valve 51 of the socket in face-to-face contact with the nose or forward wall member 22 of the adapter and with the ring-shaped valve member 25 of the adapter in face-to-face contact with the rim portion 85 of the socket body 46, there is substantially no void between the two coupling parts to be occupied by the fluid that flows through the coupling. Consequently, no appreciable quantity of fluid is lost in the operation of disconnecting the two coupling bodies, the usual "spitting" action being avoided.

To disconnect the socket 14 from the adapter 10 by remote control, it is merely necessary to close the remote control switch 84 (FIG. 6) for energization of the solenoid 82. Since the valve 80 (FIG. 5) is connected to the source of high-pressure air, opening of the valve by the solenoid instantly introduces compressed air into the annular chamber 65 (FIG. 1) to cause retraction of the locking sleeve 62. As the locking sleeve 62 approaches its completely retracted position, the compressed air from the valve is admitted into the second annular chamber 58 to create fluid pressure against the inner end of the ejector sleeve 56 to cooperate with the spring 60 to thrust the ejector sleeve against the adapter body 15. The retraction of the locking sleeve 62 followed by the powerful thrust of the ejector sleeve 56 causes the socket 14 to be disengaged and separated from the adapter 10 in an abrupt manner. When the indicator lamp 72 is de-energized and the indicator lamp 74 is energized, the remote operator knows that the two coupling bodies are completely disengaged from each other.

*Structural Details of the Socket*

The inner circumferential wall 50 of the socket body 46 is a separate section that is mounted by screw threads 94 and sealed by an O-ring 95. Integral with this section is a spider comprising a central ring 96 supported by radial legs 98. The poppet valve 51 is formed with a cylindrical stem 100 that is slidingly guided by the central ring 96, the valve spring 52 backing against the central ring. The head of the poppet valve 51 is made in two parts joined together by screw threads 102, which parts may be separated to open an annular groove for retaining an O-ring 104 for sealing contact with the rim portion 85 of the inner circumferential wall 50.

The ejector sleeve 56 is sealed in a fluid-tight manner by an inner stationary O-ring 105 that is mounted on the inner circumferential wall 50 and by a second O-ring 106 that embraces the ejector sleeve in sliding contact with the inner surface of the outer circumferential wall 53. The O-ring 106 is confined by a snap ring 108 which serves as a seat for the spring 60.

The outer circumferential wall 53 of the socket body 46 is a separate section mounted by screw threads 110 and carries a forward O-ring 112 and a rearward O-ring 114 for sealing contact with the inner cylindrical surface of the locking sleeve 62. The outer circumferential wall 53 is formed with at least one radial port 115 which is positioned between the two O-rings 112 and 114. A longitudinal bore 116 and a short radial bore 118 form a fluid passage from the valve 80 to the annular chamber 65 and an orifice member 120 in the bore 116 provides a restricted passage for flow from the valve into the annular chamber 58.

The locking sleeve 62 is made in two sections interconnected by screw threads 122 with the joint sealed by an O-ring 124. The rear end of the locking sleeve 62 is formed with a shoulder 125 which is the rear wall of the annular chamber 65. To prevent leakage from this chamber, the locking sleeve carries an inner O-ring 126 in sliding contact with the cylindrical surface of the adapter body 46. The inner circumferential surface of the locking sleeve 62 is formed with a recess 128 which forms a clearance space around the O-ring 114 when the locking sleeve is retracted as shown in FIG. 1, and which is positioned forward from the O-ring when the locking sleeve is extended as shown in FIG. 3.

When the valve 80 is opened to admit compressed air into the bore 116 to disengage the two coupling bodies, the compressed air flows freely through the radial bore into the annular chamber 65 to retract the locking sleeve 62, but only a restricted stream of air flows into the annular chamber 58 for increase in the thrust of the ejector sleeve 56 against the adapter body 15. The initial retraction movement of the locking sleeve 62, however, brings the recess 128 into the region of the O-ring 114 to permit the compressed air to flow quickly into the annular chamber 58, the path of flow being past the O-ring 114 into the recess 128 and through the previously mentioned radial port 115. Thus, the locking sleeve 62 with the recess 128 therein cooperates with the O-ring 114 to provide a valve action for delayed rush of compressed air into the annular chamber 58, which valve action causes the locking sleeve and the ejector sleeve to be retracted in timed sequence. By virtue of this arrangement, the high magnitude thrust of the ejector sleeve 56 against the adapter body 15 is delayed until the locking sleeve 62 retracts sufficiently to release the locking balls 54.

The forward end of the locking sleeve 62 is of reduced diameter to fit relatively close around the outer circumferential wall 53 in the region of the apertures 55 in which the locking balls 54 are mounted. This forward portion of the locking sleeve has a rearwardly directed shoulder 130, and the outer circumferential wall 53 is formed with a complementary stop shoulder 132 for cooperation therewith. The forward rim of the locking sleeve 62 is cut away from the inside, as indicated at 134 in FIGS. 1 and 2, to form clearance for permitting the locking balls 54 to move to their normal outward radial positions when the locking sleeve is retracted.

The U-shaped lanyard 66 may comprise a flexible piece of cable, each end of which has a ball 135 united therewith, as shown in FIG. 4, for anchorage to the locking sleeve 62. Each ball 135 is seated in a socket 136 in a radial projection 138 of the locking sleeve. Each of the two arms of the lanyard cable extends through a corresponding guide aperture 140 in a radial projection 142 of the adapter body 46, which guide aperture is aligned with the ball socket 136 to hold the end portion of the lanyard cable parallel with the axis of the socket.

A feature of the invention is the concept of providing what may be termed a fulcrum body 144 on each end of the lanyard cable 66 in a position for abutment against the radial projection 142 when the locking sleeve 62 is in its forward locking position. Each fulcrum body 144 has a forward face 145 of substantial lateral extent. If the lanyard 66 is pulled laterally instead of longitudinally to retract the locking sleeve 62, the lateral pull rocks the fulcrum body 144 to rock the face 145 relative to the contiguous face of the radial projection 142, thus providing a leverage action to multiply the manually applied force for retracting the locking sleeve.

The switch chamber 68 is accessible through a removable plate 146 (FIG. 3) and contains a U-shaped bracket 148 (FIG. 4) which supports the opposite ends of a pair of guide rods 150. The previously mentioned switch actuator 76 is slidingly mounted on the two guide rods 150 and has a laterally extending finger 152 to actuate the two switches 70 and 72. Preferably, each guide rod 150 is equipped with a coil spring 154 which exerts forward thrust on the switch actuator, which thrust is added to the thrust of the ejector sleeve spring 60. The push-pull rod 78 that connects the switch actuator 76 with the ejector sleeve 56 is surrounded by suitable sealing means 155 (FIG. 4) to keep high-pressure fluid in the chamber 58 from leaking into the switch chamber 68.

As shown in FIG. 6, each of the two lamp switches 70 and 72 may be of a sensitive type suitably adapted for actuation by the finger 152 of the switch actuator 76. In the construction shown, each of the two lamp switches is formed with a slightly angular leaf spring 160 which is positioned to be wiped by the finger 152 for actuation of the switch.

The inlet side of the valve 80 is provided with a screw fitting 156 (FIG. 5) which is used to connect the valve to an air hose 158 shown in phantom in FIG. 3, this air hose being connected to a source of compressed air. Thus, with the valve 80 mounted on the socket 14 instead of being at the far end of the air hose 158, the opening of the valve results in instantaneous introduction of compressed air into the annular chambers 58 and 65.

As shown in FIG. 5, the valve 80 provides a longitudinal flow passage 162 which is intercepted by a transverse valve member 164. The valve member 164 is connected to the armature 165 of the solenoid 82. The solenoid 82 is mounted in a sealed cylindrical chamber 166 that is closed by a screw plug 168.

As shown in FIG. 3, the socket body 46 has a tubular extension 170 which is equipped with an electrical plug fitting 172 to permit the adapter to be connected to an electric cable to complete the required circuitry. This plug fitting 172 is shown diagrammatically in FIG. 6.

FIG. 6 shows four wires 173, 174, 175 and 176 that make up the electric cable, the wire 175 having a branch 178. FIG. 6 also shows a remote control panel 180 on which is mounted the previously mentioned remote control switch 84 and the two indicator lamps 74 and 75. One side of the switch 184 is connected to the wire 176, and the other side is connected to the two lamps 74 and 75 by a wire 182.

One side of the lamp switch 70 is connected to the indicator lamp 74 by a wire 184 and the corresponding cable wire 73. One side of the other lamp switch 72 is connected to the indicator lamp 75 by a wire 185 and the corresponding cable wire 174. The second side of each of the lamp switches 70 and 72 is connected by a wire 186 to the corresponding cable wire 175 which, in turn, is connected to an E.M.F. source. One side of the solenoid 82 is connected by a wire 188 to the branch wire 178 of the cable for communication with the same E.M.F. source. The other side of the solenoid is connected to the remote control switch 84 by a wire 190 and the corresponding cable wire 176.

FIG. 7 shows how the solenoid valve 80 may be placed in communication with the fluid inside the coupling instead of being connected to an outside source of pressurized fluid. A bore 92 in the socket body 46, indicated by broken lines, extends from the interior of the body to a transverse bore 94 that leads to the inlet of the solenoid valve 80.

My description in specific detail of the selected embodiments of the invention will suggest various changes, substitutions and other departures from my disclosure within the spirit and scope of the appended claims.

I claim:

1. A coupling for releasably connecting a first fluid passage with a second fluid passage, comprising: a first coupling body to form an end portion of said first fluid passage, said coupling body having a rearwardly facing shoulder; a second coupling body to form an end portion of said second fluid passage, means carried by said second coupling body to releasably engage said shoulder to lock the two coupling bodies together, said locking means being retractable to release the two coupling bodies from each other; a lanyard connected to said locking means for manual retraction thereof; an abutment on said second coupling body having an aperture with said lanyard passing therethrough; and a fulcrum member carried by said lanyard and having a lateral surface extending along said abutment at the normal position of the lanyard, whereby a lateral manual pull on said lanyard at a point beyond the fulcrum member rocks the fulcrum member against the abutment to pull said lanyard through said aperture.

2. A coupling for releasably connecting a first fluid passage with a second fluid passage, comprising: a first coupling body to form an end portion of said first fluid passage, said coupling body having a rearwardly facing shoulder; a second coupling body to form an end portion of said second fluid passage, radially expansible and contractible engagement means carried by said second coupling body to telescope over said first coupling body and to contract into engagement with said circumferential shoulder; a locking sleeve mounted on said second coupling body and axially movable thereon between a retracted position and a forward position surrounding and locking said engagement means in engagement with said shoulder; spring means urging said locking sleeve towards its forward locking position; fluid-pressure-actuated means including a first fluid-pressure power chamber on said second coupling body to retract said locking sleeve to free said engagement means from said shoulder; an ejector means carried by said second coupling body and movable relative thereto to advance to thrust against said first coupling body to separate the two coupling bodies when said locking sleeve is retracted; and fluid-pressure-actuated means including a second fluid-pressure power chamber on said second coupling body to advance said ejector means.

3. A combination as set forth in claim 2, which includes passage means to supply fluid under pressure to said first power chamber for retraction of the locking sleeve; and which includes valve means responsive to said locking sleeve to place said second power chamber in free flow communication with said passage means when said locking sleeve is retracted by the first fluid-pressure-responsive means.

4. A combination as set forth in claim 2 which includes remote means to control the flow of fluid to said first and second power chambers.

5. A combination as set forth in claim 4, which includes remote signal means responsive to a moving part on said second coupling body to indicate whether or not said coupling bodies are locked together.

6. A combination as set forth in claim 5, in which said signal means is responsive to movement of said ejector means.

7. A coupling for releasably connecting a first fluid passage with a second fluid passage, comprising: a first coupling body to form an end of said first fluid passage, said coupling having a first circumferential wall with an outer rearwardly facing circumferential shoulder; a second coupling body to form an end of said second fluid passage, said second coupling body having a second circumferential wall to telescope over said first circumferential wall; engagement means carried by said second coupling body retractibly extendable into engagement with said circumferential shoulder to hold the two coupling bodies telescoped together; a locking sleeve mounted on said second coupling body and axially movable thereon between a rearward retracted position and a forward position surrounding and locking said engagement means in engagement with said circumferential shoulder; spring means urging said locking sleeve towards its locking position; an ejector sleeve telescoped inside said second circumferential wall and movable between a forward position inside said engagement means to keep the engagement means extended and a retracted position to permit the engagement means to contract into engagement with said circumferential shoulder, said ejector sleeve being dimensioned to abut said first circumferential wall to be retracted thereby when the two circumferential walls are telescoped together; spring means to urge said ejector sleeve towards its forward position thereby to thrust against said first circumferential wall to urge the two coupling bodies apart; and sealing means carried by one of said coupling bodies to cooperate with the other coupling body to seal the juncture between the two coupling bodies when the two coupling bodies are locked together, said second coupling body and said locking sleeve forming an annular chamber to receive fluid under pressure for retraction of the locking sleeve, said second coupling body and said ejector sleeve forming a second chamber to receive fluid under pressure for extension of the ejector sleeve.

8. A combination as set forth in claim 7, in which said second coupling body has a third circumferential wall to telescope into said first circumferential wall, said sealing means being mounted on one of said first and third circumferential walls for sealing cooperation with the other of said first and third circumferential walls.

9. A combination as set forth in claim 7, which includes valve means carried by said second coupling body to control the admission of fluid under pressure into said two chambers.

10. In a coupling for releasably connecting a first fluid passage in a housing with a second fluid passage outside the housing wherein a first coupling body is mounted in the housing adjacent the surface thereof and a second coupling body for the second fluid passage releasably engages said first coupling body and is provided with a locking sleeve to keep the two coupling bodies engaged, said locking sleeve being urged forward by spring means, the improvement comprising: an annular member of resiliently deformable rubber-like material positioned on the leading end of said locking sleeve to make pressure contact with the surface of said housing to form therewith a weather-proof seal when the two coupling bodies are locked together.

11. In an aerial vehicle having an outer wall and an exposed first coupling for releasable engagement with a second complementary coupling outside the vehicle for supplying fluid to the vehicle, wherein the first coupling has a body with a cylindrical portion to telescope into the second coupling and the first coupling has an axial portion smaller in diameter than said cylindrical portion thereof to form therewith an annular passage to receive fluid from the first coupling, and wherein a valve member carried by said first coupling normally closes said annular passage and is retractable by the second coupling to a position opening the passage, the improvement to streamline the vehicle comprising: said wall having an opening larger than said cylindrical portion of the first coupling and surrounding the cylindrical portion to form therewith an annular space to receive said second coupling, said cylindrical portion and said axial portion of the first coupling being substantially flush with the wall; the normally closed position of said valve member being substantially flush with the wall; and an annular member normally closing said annular space at a position substantially flush with the wall, said annular member being yieldable for retraction by said second coupling.

References Cited in the file of this patent

UNITED STATES PATENTS

| | | |
|---|---|---|
| 834,362 | Cram | Oct. 13, 1906 |
| 1,387,508 | Nescher | Aug. 16, 1921 |
| 2,320,456 | Frazer-Nash | June 1, 1943 |
| 2,377,812 | Scheiwer | June 5, 1945 |
| 2,476,480 | Burckle et al. | July 19, 1949 |
| 2,638,916 | Scheiwer | May 19, 1953 |
| 2,660,456 | Meddock | Nov. 24, 1953 |
| 2,665,926 | Fraser | Jan. 12, 1954 |
| 2,675,829 | Livers | Apr. 20, 1954 |
| 2,689,143 | Scheiwer | Sept. 14, 1954 |
| 2,705,159 | Pfau | Mar. 29, 1955 |
| 2,727,759 | Elliott | Dec. 20, 1955 |
| 2,824,755 | Lamphear | Feb. 25, 1958 |
| 2,837,352 | Wurzburger | June 3, 1958 |
| 2,905,486 | Goodin et al. | Sept. 22, 1959 |
| 2,921,802 | Canner | Jan. 19, 1960 |
| 2,959,024 | Eckert et al. | Nov. 8, 1960 |